Feb. 17, 1931.   G. B. UPTON ET AL   1,792,785
SHUTTER CONTROL
Filed April 8, 1929   2 Sheets-Sheet 1

Inventors
George Burr Upton &
Roland W. Hutchinson

Feb. 17, 1931.  G. B. UPTON ET AL  1,792,785
SHUTTER CONTROL
Filed April 8, 1929  2 Sheets-Sheet 2
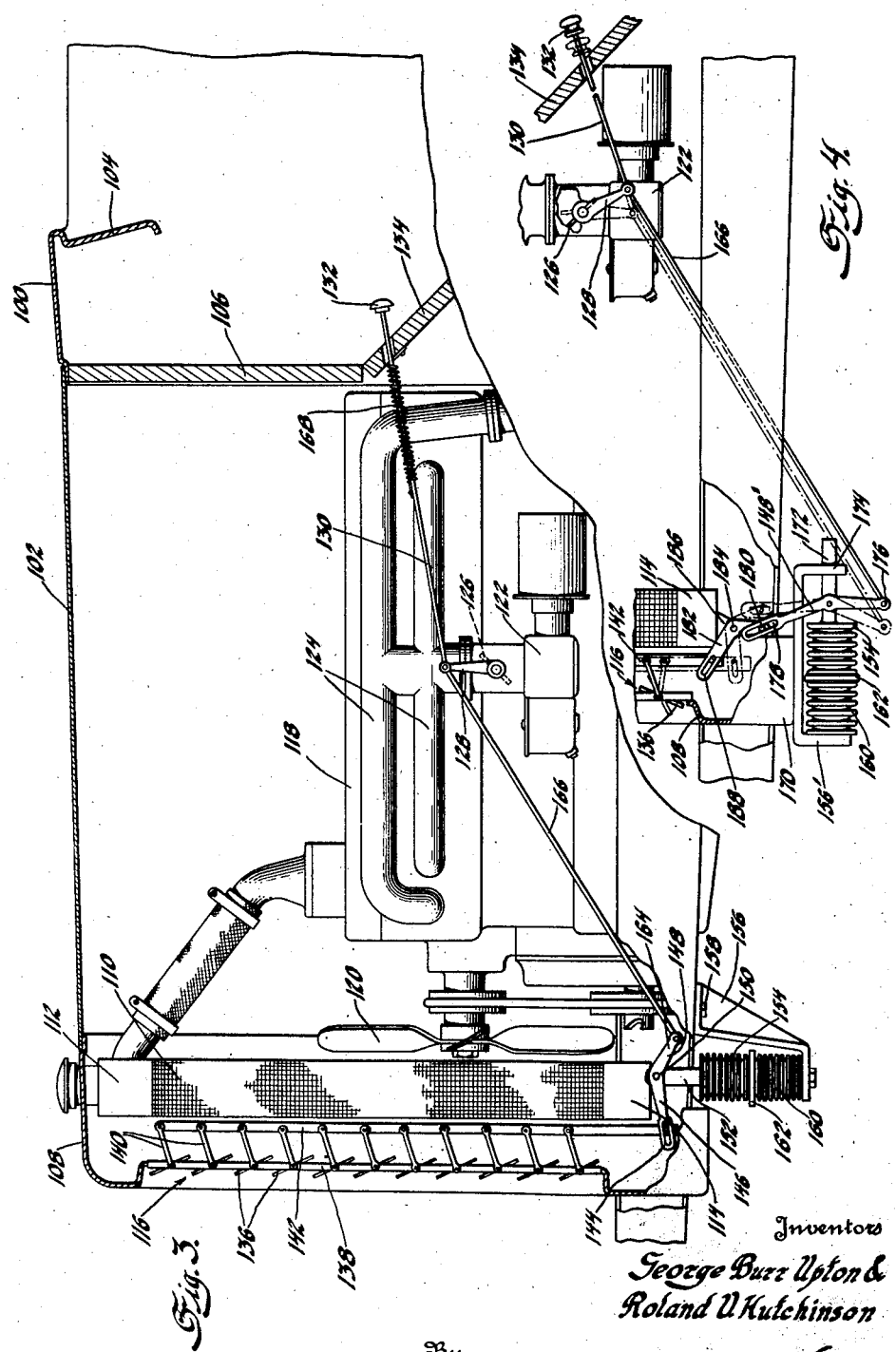
Inventors
George Burr Upton &
Roland U Hutchinson
By
Blackmore, Spencer & Fish
Attorneys Patented Feb. 17, 1931

1,792,785

UNITED STATES PATENT OFFICE

GEORGE BURR UPTON, OF ITHACA, NEW YORK, AND ROLAND V. HUTCHINSON, OF LANSING, MICHIGAN, ASSIGNORS TO GENERAL MOTORS RESEARCH CORPORATION, OF DETROIT, MICHIGAN, A CORPORATION OF DELAWARE

SHUTTER CONTROL

Application filed April 8, 1929. Serial No. 353,442.

This invention relates to the control of cooling systems of internal combustion engines and is adaptable for use on aeroplanes and automobiles, and may be applied to air cooled engines or to engines having a radiator and a water circulating system.

The invention is particularly adaptable and beneficial to aeroplanes for the reason that aeroplanes are subject to greater and more sudden changes in altitude and temperature. However, in the modern advanced stage of the automobile, where it is required to and does make long trips across country where there are changes in altitude from sea level up to an excess of one mile, the cooling conditions vary because of a change in the density of the atmosphere and of the outside temperature. Owing to the rarer atmosphere encountered at higher altitudes, a greater volume of air is required to effect the same amount of cooling accomplished at lower levels. In the present invention there is accordingly applied to the regulating or operating means of the device or means for controlling the admission of air, such as the usual shutter, a thermo-sensitive means in the form of a thermostatic bellows and also a pressure responsive means in the form of an exhausted bellows, both of which are preferably interconnected and are attached to the pivot of a link of the operating system and shift the pivot in accordance with the pressure and temperature of the outside air. At lower altitudes the pressure responsive member is contracted which will pull the pivot downward and tend to close the shutter to admit less air, while the reverse takes place at higher altitudes where the barometric pressure is lower. The thermo-sensitive member adjusts the air control means in accordance with temperature. If the temperature is relatively high, the thermostat expands and shifts the pivot so as to cause an increased opening of the shutter or control means to thereby permit of the admission of a greater amount of air. With a fall in temperature the thermostat will contract and shift the pivot to close the shutter to admit of a lesser amount of air. The two devices will accordingly compensate for changes in pressure or altitude and temperature and will regulate or control the admission of air in accordance with outside barometric and temperature conditions.

The operating mechanism for the shutter or air flow control is preferably though not necessarily interconnected with the throttle so that as the throttle is opened the shutter will simultaneously be opened to admit air. The mechanism may be operated independently of the throttle.

The throttle is operated in the usual way from the cock pit of the aeroplane or from the driver's seat of the automobile and has connected to its arm a link which is pivoted at its other end to one arm of a lever (preferably a bell crank) the second arm of which is joined to the shutter or air flow control device by means of a lost motion connection to permit of the proper operation.

An exhausted bellows responsive to changes in pressure is rigidly secured to any suitable stationary or fixed part of the automobile or aeroplane and to this bellows there is secured a thermostatic bellows to which is attached the pivot of the lever. The lever may operate either one or more shutters depending upon whether a V type aeroplane engine or an in line internal combustion engine of the usual automotive vehicle is used. The operation in both instances being identical.

It is also immaterial whether the engine is cooled by air or by water. The air flow control or shutter will operate the same in both instances to cool the engine, either by direct contact of the air stream with the engine or by causing the air to flow through a radiator core to cool the water of a conventional water circulating system.

On the drawing:

Fig. 3 shows the invention applied to a water cooled internal combustion engine of an automotive vehicle.

Fig. 4 is a modification of the structure of Fig. 3, showing the operated position of the parts in dotted outline.

Figure 1:
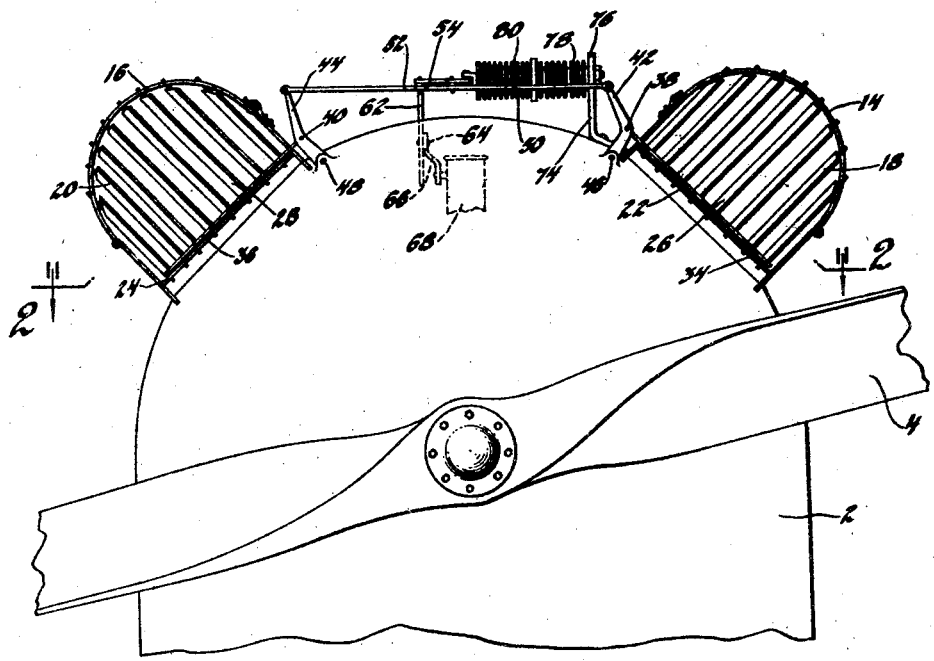
Fig. 1 shows the invention applied to an aeroplane with a V type air cooled engine.

Referring to the drawing, the numeral 2 indicates the fuselage of an aeroplane, 4 the propeller mounted in front of the fuselage on the crank shaft 6. The engine 8 is of the V type having the banks of cylinders 10 and 12 over each of which there are applied the hoods 14 and 16 which catch the air and force it downward over the banks of cylinders 10 and 12 to effect an air cooling. From the engine the air is passed to the bottom of the fuselage by means of suitable baffling and leaves the aeroplane under the cock pit.

In front of both banks of cylinders and controlling the opening of the hoods 14 and 16, are the air flow control means in the form of shutters 18 and 20. The shutters are shown as of the vertically pivoted type and have their upper journals in the hoods 14 and 16 and their lower journals in two bands or straps 22 and 24 rigidly mounted at the lower portions of the hoods 14 and 16. If desired the shutters may be mounted in suitable frames independent of the hoods. The individual plates 26 and 28 of the shutters 18 and 20 respectively have each an arm 30 and 32, the ends of which are pivoted to movable links 34 and 36. The links 34 and 36 are suitably pivoted, preferably by a lost motion connections 38 and 40, to levers 42 and 44 pivoted as at 46 and 48 to the upper portion of the fuselage 2. The extremities of the levers 42 and 44 are connected by means of the rods 50 and 52 to one arm 54 of the bell crank lever 56, the opposite arm 58 of which is pivoted as at 60 to a rod 62 connected as at 64 to the arm 66 which operates the throttle valve of the carburetor 68. The arm 66 is further connected by means of a rod or wire 70 to a handle 72 which extends inside the cock pit of the aeroplane.

Rigidly secured to the outer portion of the fuselage is a bracket 74 having the upwardly extending arm 76 and to which is secured so as to be subject to outside effects, a pressure responsive member 78 which is preferably in the form of an exhausted bellows secured at one end.

To the free end of the bellows 78 there is secured the thermo-sensitive member 80, preferably in the form of a bellows filled with a suitable heat responsive or readily volatile liquid such as ether or a combination of alcohol and carbon tetrachloride. The end of the thermostat 80 is suitably connected by means of the arm or extension 82 to the pivotal point 88 of the bell crank lever 56.

Figure 2:
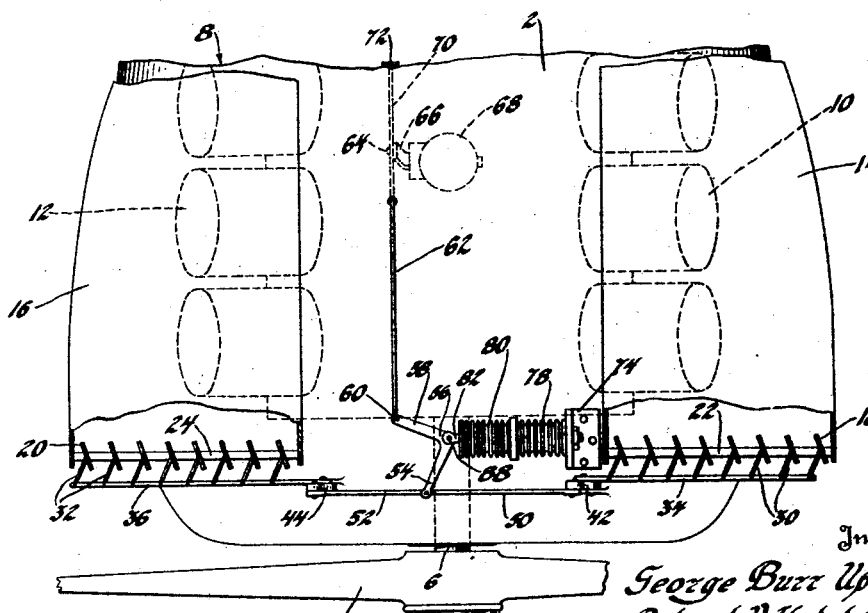
Fig. 2 is a plan view of the structure of Fig. 1.

Considering the structure shown in Fig. 2, it will be apparent that as the aeroplane rises or descends the exhausted bellows 78 will expand or contract, respectively, to move the pivot outwardly or inwardly, respectively, which will cause the opening or closing, respectively, of the shutters 18 and 20. The pressure responsive member 78 will therefore compensate for changes in pressure to admit a greater or less amount of cooling air as required.

The thermostat 80 will respond to temperature changes and accordingly as the temperature is high or low, the thermostat will expand or contract to move the pivot 88 outwardly or inwardly, respectively, to accordingly open or close the shutters 18 and 20. It is therefore evident that the thermostat 80 will compensate for changes in temperature and permit the variation of the admission of air in accordance with outside temperature. The higher the temperature the greater the opening of the shutter and larger admission of air and vice versa.

The operation of the shutters by means of the handle 72 takes place in the well known manner. As the handle is pulled to open the throttle valve, the link 62 will likewise be pulled to operate the bell crank lever 56 which will open the shutters 18 or 20. The opening of the shutters will therefore take place simultaneously with the opening of the throttle valve and obviously the closing of the shutters will take place with the closing of the throtte valve.

Referring to Fig. 3 the invention is illustrated as applied to the ordinary water cooled engine used on automotive vehicles. In Fig. 3 the numeral 100 indicates the cowl, 102 the hood, 104 the instrument board, 106 the dash board, 108 the radiator shell, 110 the radiator core, 112 and 114 the upper and lower tanks respectively of the radiator, 116 the shutter as a whole, 118 the engine, 120 the fan, 122 the carburetor, and 124 the manifold system, all of which parts are conventional and form no part of the invention except in so far as they relate to the combination.

The carburetor 122 includes the throttle 126 the stem of which has the arm 128 which is operated from a rod 130 extending inside the vehicle and operated by the head 132 projecting past the foot board 134.

The shutter 116 comprises the individual shutter blades 136 which in the modification shown are illustrated as working on horizontal pivots. All of the blades 136 are pivoted to straps 138 secured to the shell 108 and for each pivot an arm 140 is provided. The opposite ends of the arms are pivoted to a shiftable link or bar 142, the lower end of which is connected by means of a lost motion connection 144 to one arm 146 of a bell crank lever 148 pivoted as at 150 to an arm 152, rigid with a thermo-sensitive member 154, preferably in the form of a bellows filled with a suitable highly volatilizable liquid such as ether or a mixture of alcohol and carbon tetrachloride. Instead of the lost motion connection 144 an extra link may be inserted to pivotally connect the arm 146 and the shiftable link 142.

A pressure responsive member 160, preferably in the form of an exhausted bellows, is mounted on a bracket 156, rigidly secured as at 158 to any stationary portion of the vehicle such as the chassis side bar or cross member supporting the radiator. The two bellows 154 and 160 are preferably interconnected and have the dividing or separating plate 162.

The bell crank lever 148 has its second arm 164 connected to the arm 128 of the throttle valve by means of the rod or link 166.

The purpose of the exhausted pressure responsive bellows 160 is to compensate for changes in altitude. As the automobile travels over a road which, for example, may have an up-grade so as to bring the machine into altitudes having an appreciably rarer atmosphere, the bellows 160 will expand to thereby push the pivot 150 upward and cause a corresponding opening of the shutter 116 to admit a greater quantity of air to effect equal cooling of the engine cooling system. When the vehicle reaches a lower altitude the pressure responsive member 160 will contract to pull the pivot 150 downward which will shift the rod or bar 142 to close the shutter to admit a less quantity of air owing to the increased density of the atmosphere.

The thermo-sensitive member 154 is to compensate for changes in temperature. When the outside temperature is relatively warm the thermostat will expand to shift the pivot 150 upward to open the shutter to admit of a larger quantity of air to cool the engine cooling system. As the outside temperature decreases the thermostat will contract to pull the pivot downward to close the shutter to admit of a lesser quantity of air. These changes are desirable for the reason that when the outside temperature is cool a lesser amount of air is required to effect the desired cooling.

The throttle is operated in the usual way by placing the foot on the button or knob 132 which will shift the link 130, arm 128, link 166, bell crank 148 to push the rod 142 upward to open the shutters. When the foot is released from the knob 132 the spring 168 will return the parts to their original position.

In the structure of Fig. 4, a modification of the disclosure of Fig. 3 is provided. The foot board 134, rod 130, throttle 126, throttle arm 128, link or rod 166 are the same as shown in Fig. 2, except that the throttle arm 128 is directed downwardly. The pressure responsive bellows 160 and thermostat 154 and mid plate 162 are also the same as shown in Fig. 1.

The difference in the two species consists in the arrangement or positioning of the two bellows 154 and 160. Both are held in a bracket 156' which is fixed in any suitable way to any suitable stationary part of the vehicle such as the lower portion 170 of the radiator shell 108 so as to be exposed to outside temperature and barometric conditions. The thermostat 154 has attached to its free end the rod or extension 172 which operates freely in an opening in a arm 174 of the bracket 156'. To the rod 172 there is pivoted the lever 148' one end of which is pivoted as at 176 to the rod 166 while the other end has a slot 178 receiving a pin 180 of one arm of a bell crank lever 182 pivoted at 184 to an ear 186 suitably secured to the lower tank 114 of the radiator. The opposite end of the bell crank lever 182 has a lost motion connection 188 in the form of a pin and slot with the rod or bar 142 which operates the shutter 116 in the usual way.

The dotted line position in Fig. 4 is illustrative only and shows the mechanism moved to shutter open position. The operation of the device is substantially identical with that shown in Fig. 3, but in Fig. 4 the bar 142 is moved downward to open the shutter instead of upward as in Fig. 3.

The shutters in all instances are provided with the usual return springs (not shown) which always urge them to closed position.

The present invention is an improvement over that of application No. 277,343, May 12, 1928, and the conditions set out and described therein are substantially equally true of the present application.

We claim:

1. In combination with an internal combustion engine having a cooling system, means to control the flow of air to the cooling system, means to operate said control means, and thermo-sensitive and pressure sensitive means to directly regulate and/or control the position of said operating means.

2. In combination with an internal combustion engine having a cooling system, means to control the flow of air to the cooling system, means interconnected with the throttle for operating said control means and pressure responsive means to regulate and/or control said operating means.

3. In combination with an internal combustion engine having a cooling system, means to control the flow of air to the cooling system, means interconnected with the throttle for operating said control means, and thermo-sensitive and pressure sensitive means to regulate and/or control the position of said operating means.

4. In combination with an internal combustion engine having a cooling system, means to control the flow of air to the cooling system, means to operate said control means, and a bellows type thermostat and a pressure responsive bellows directly interconnected for directly controlling and/or regulating said operating means.

5. In combination with an internal combustion engine having a cooling system, means to control the flow of air to the cooling system, means interconnected with the throttle for operating said control means, and an expandible and contractible pressure responsive bellows for controlling and/or regulating said operating means.

6. In combination with an internal combustion engine having a cooling system, means to control the flow of air to the cooling system, means interconnected with the throttle to operate said control means, and a bellows type thermostat and an expandible and contractible pressure responsive bellows to regulate and/or control said operating means.

7. In combination with an internal combustion engine having a cooling system, means to control the flow of air to the cooling system, means interconnected with the throttle to operate said control means, thermo-sensitive means attached to said operating means, and pressure responsive means to which said thermo-sensitive means is attached, said thermo-sensitive and pressure responsive means controlling and/or regulating the position of said operating means.

8. In combination with an internal combustion engine having a cooling system, means to control the air flow to the cooling system, means for operating said control means, a fixed pressure responsive bellows, and a bellows thermostat connected to said pressure responsive bellows and to said operating means, said two bellows regulating and/or controlling the position of said control means to compensate for differences in temperature and altitude to accordingly vary the amount of air admitted past said control means.

9. In combination with an internal combustion engine having a cooling system, means to control the flow of air for the cooling system, means including a lever pivoted between its ends for operating said control means, and a thermo-sensitive means connected to the pivot of said lever for shifting the pivot in response to changes in temperature to vary the amount of air admitted by said control means.

10. In combination with an internal combustion engine having a cooling system, means to control the air flow for the cooling system, means including a lever pivoted intermediate its ends for operating said control means, and a pressure responsive means operatively connected to the pivot of said lever for shifting the pivot in response to changes in altitude to vary the amount of air admitted by said control means.

11. In combination with an internal combustion engine having a cooling system, means to control the air flow for the cooling system, means for operating said control means including a pivoted lever, a thermo-sensitive means connected to the pivot of said lever, and pressure responsive means permanently mounted at one end and connected to said thermo-sensitive means at its other end, said thermo-sensitive and pressure responsive means adapted to shift said pivot in response to changes in temperature and altitude to vary the admission of air to the cooling system by said control means.

12. In combination with an internal combustion engine, having a cooling system, means to control the air flow for the system, a throttle, means interconnected with the throttle for operating said control means including a pivoted lever, and thermo-sensitive means connected to the pivot of said lever and adapted to shift said pivot in response to temperature changes to vary the amount of air admitted by said control means.

13. In combination with an internal combustion engine having a cooling system, means to control the air flow for said system, a throttle, means interconnected with the throttle to operate said control means including a lever, and pressure responsive means operatively interconnected with the pivot of said lever to shift said pivot in response to or to compensate for changes in altitude to thereby vary the amount of air admitted by said control means.

14. In combination with an internal combustion engine having a cooling system, a throttle, means to control the air flow for said system, comprising a link connected to the throttle, a lever pivoted to said link and to said control means by a lost motion connection, a pressure responsive bellows permanently secured at one end, and a thermo-sensitive means secured to the free end of said bellows, said lever pivoted to said thermo-sensitive means to cause a shifting of the lever's pivot to compensate for changes in altitude and temperature to vary the admission of air by said control means in accordance with outside conditions.

15. In combination with an internal combustion engine having a cooling system, means to control the air flow for the cooling system, means for operating said control means including a pivoted lever, a joined thermo-sensitive means and pressure responsive means connected to the pivot of said lever, said thermo-sensitive and pressure responsive means adapted to shift said pivot in response to changes in temperature and altitude to vary the admission of air to the cooling system by said control means.

16. In combination with an internal combustion engine having a cooling system, means to control the air flow for the cooling system, means for operating said control means including a pivoted lever, a joined thermo-sensitive means and pressure responsive means permanently mounted at one end and connected to the pivot of said lever at the other end, said thermo-sensitive and pressure responsive means adapted to shift said pivot in response to changes in temperature and altitude to vary the admission of air to the cooling system by said control means.

In testimony whereof we affix our signatures.

GEORGE BURR UPTON.
ROLAND V. HUTCHINSON.